Dec. 25, 1928.

D. D. ROSENBURGH 1,696,814

PRESSURE GAUGE

Filed Dec. 15, 1926

INVENTOR:
Durwood D. Rosenburgh
BY
Alfred Burger
his ATTORNEY

Patented Dec. 25, 1928.

1,696,814

UNITED STATES PATENT OFFICE.

DURWOOD D. ROSENBURGH, OF ROCHESTER, NEW YORK, ASSIGNOR TO TAYLOR INSTRUMENT COMPANIES, OF ROCHESTER, NEW YORK, A CORPORATION OF NEW YORK.

PRESSURE GAUGE.

Application filed December 15, 1926. Serial No. 155,095.

This invention relates to pressure gauges and more in particular to instruments of the type including means for modifying the normal response of the pressure-responsive element to effect different rates of movement of the indicating or recording member at different pressure values.

Instruments of this type generally include a restraining or retarding element so constructed and arranged as to permit the pressure-responsive element to function normally during part of its movement and to restrain or retard its action, directly or indirectly, during another part of its movement with the intended result that the scale readings are relatively open over a part of the scale range and relatively crowded or condensed over another part.

The present invention has for its general object to provide an instrument of the character referred to which is exceedingly simple in construction and operation and permits accurate adjustment.

It should be understood that instruments of the type involved are generally well known and that I claim novelty only for the specific construction hereinafter described and more particularly pointed out in the claims.

In the drawings, which form a part of the specification,

Figure 2:
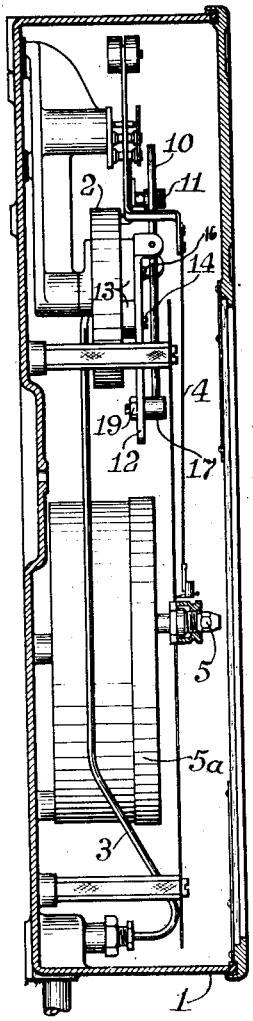
Fig. 2 is a section taken at right angles thereto.
Figure 1:
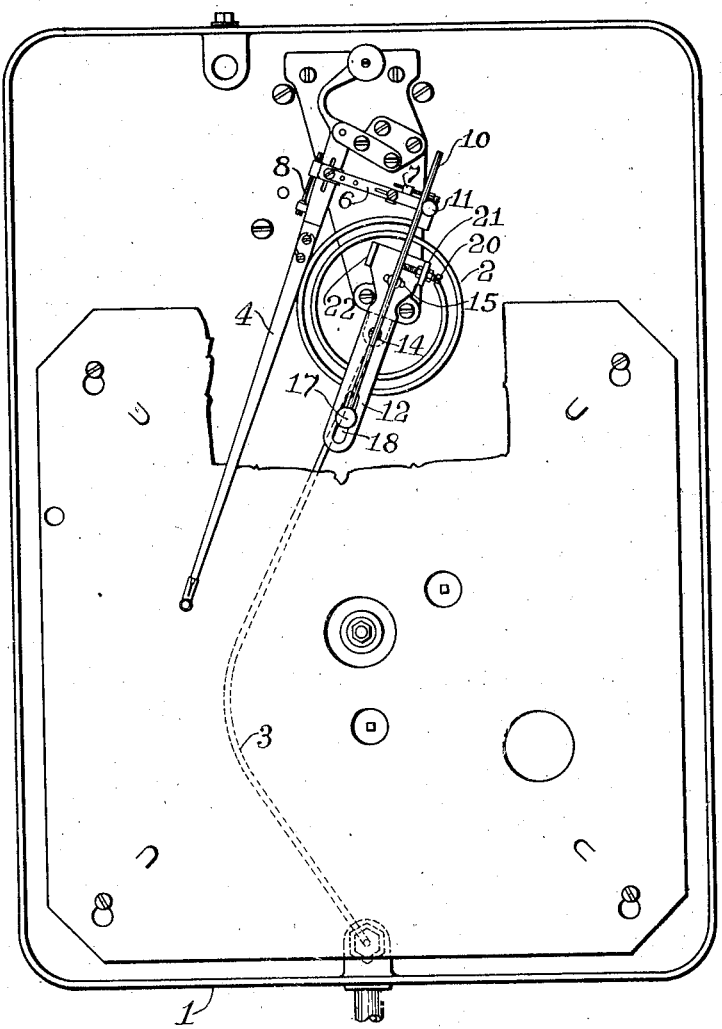
Fig. 1 is a front elevation of an instrument embodying the invention.

In the drawings 1 represents the usual casing containing the mechanism including a pressure-responsive element, in the particular instance a spring tube 2 of the Bourdon tube type, a capillary connection 3, leading to the spring tube 2, a recording pen arm 4 and mechanism for translating the movement of the spring tube 2 to the pen arm 4 which represents generally a member cooperating with a scale to afford a pressure indication. In the particular instance, the scale is embodied in the form of the usual chart (not shown) which is rotated by means of the arbor 5 of a clock 5ª, as is well understood.

The mechanism for translating the movement of the spring tube 2 to the pen arm 4, as is generally understood, may have any form suitable for the purpose and in the particular instance includes a link 6 interconnecting the free end of the spring tube 2 and the pen arm 4. The link 6 is preferably provided with means for varying its effective length, including a screw 7 and with means for adjusting the pivot connection with the pen arm 4, including a screw 8. However these parts do not form a part of the invention.

The invention proper comprises a resilient wire 10 disposed transversely of the link 6 and secured at one end to a stationary support remote from the link 6 while the free end of the wire co-operates with a pin 11 on the link 6.

The support for the wire 10 is an arm 12 preferably secured to the stationary part 13 to which the inner end of the spring tube 2 is attached and which defines a connecting passage between the capillary connection 3 and the stationary end of the tube 2. The arm 12 has a pivot connection 14 with the part 13 and means for adjusting its angular relation to the latter, including an arcuate slot 15 on the arm 12 and a clamping screw 16 extending through the slot 15 into the part 13.

The wire 10 is secured in a stud 17 which is movable in a slot 18 on the arm 12 and may be fixed in any desired position, by means of a nut 19 or in any other suitable manner.

The practical significance of the invention is as follows:

For a spring wire of given diameter and definite elastic properties the resistance to flexing varies with the effective length. In the particular instance, the effective length i. e. the distance between the stud 17 and the pin 11, may be varied within relatively wide limits by moving the stud 17 from one end of the slot 18 to the other. The longer the wire, the more gradual is the variation of the resistance to flexing.

By means of the pivotal connection 14 and the arcuate slot 15, the arm 12 and with it the wire 10 may be readily adjusted to precisely determine the point at which the retarding action of the spring wire 10 is to begin and cease respectively, depending upon the direction of motion of the pin 11.

Increase of pressure in the spring tube 2 causes expansion of the latter and, conversely, decrease of pressure causes contraction. Assuming for the sake of description that the pressure to be measured varies from sub-atmospheric to superatmospheric and that the range of the scale indicating subatmospheric pressure is to be relatively open and the range of superatmospheric pressure relatively condensed, the wire 10 is so placed relatively to the pin 11 that it does not interfere with the movement of the latter while the spring tube 2 is acted upon by pressure below atmospheric pressure and that it impedes or retards the movement of the pin 11 while the spring tube 2 is acted upon by pressure above atmospheric pressure.

I prefer to provide a set screw 20 for initially flexing or tensioning the wire 10 to any desired extent instead of allowing it to assume a neutral position. The initial flexing by means of the set screw 20 is primarily intended to provide an initial tensioning to insure a return of the wire when released by pin 11 to a definite position.

The set screw 20 is mounted in an ear 21 projecting outwardly from the arm 12. In practice I provide an additional ear 22 for the reception of the set screw 20 for the case that in some particular arrangement the relation of the pin 11 and the wire 10 is reversed.

It is understood that the spring wire 10 need not be round, but may have a different cross-sectional form.

I claim:

1. In apparatus of the character described, the combination with a pressure-responsive system including a pressure-responsive element, an arm and means for translating movement of the pressure-responsive element, of a spring wire, means for adjusting the position of the wire in the direction of its length and a projection on the pressure-responsive system, the wire being disposed on one side of the projection in the path of motion thereof to be flexed thereby.

2. Apparatus according to claim 1 wherein the support includes a stationary part and a part movable relatively thereto transversely of the direction of length of the wire, the latter being secured to the movable part.

3. In apparatus of the character described, the combination with a pressure-responsive element, an arm and means for translating movement from the pressure-responsive element to the arm, of a projection on the translating mechanism, a spring wire disposed in the path of the projection to be flexed thereby, and means for adjusting the position of the wire, including a stationary part, a member movably supported on said stationary part and means for securing the other end of the wire on the said movable member.

4. In apparatus of the character described, the combination with a pressure-responsive element, an arm and means for translating movement from the pressure-responsive element to the arm, of a projection on the translating mechanism, a spring wire disposed in the path of the projection to be flexed thereby, and means for adjusting the position of the wire, including a stationary part and means movable relatively thereto for adjustably supporting the wire for movement in the direction of its length and for angular movement.

5. In apparatus of the character described, the combination with a pressure-responsive element, an arm and means for translating movement from the pressure-responsive element to the arm, including a projection on the translating mechanism, a spring wire disposed in the path of the projection to be flexed thereby, a support for one end of the spring wire permitting angular movement thereof toward and away from said projection and means operative in any angular position of the spring wire for initially flexing the same in a direction away from the projection.

6. In apparatus of the character described, the combination with a pressure-responsive element, an arm and means for translating movement from the pressure-responsive element to the arm, including a projection on the translating mechanism, a spring wire disposed in the path of the projection to be flexed thereby, and means for adjusting the position of the spring comprising means for adjustably supporting one end of the wire for movement in the direction of length thereof, means for varying the angular position of the wire and means for adjustably flexing the wire in the direction away from the said projection.

7. Apparatus according to claim 6, wherein the means for adjusting the position of the spring includes a stationary support, an arm pivotally supported on the stationary support, a connection between the end of the wire and the arm for supporting the latter, the connection being movable on the arm in the direction of length thereof, and means on the arm for adjustably flexing the wire.

In testimony whereof I affix my signature.

DURWOOD D. ROSENBURGH.